(12) United States Patent
Lin et al.

(10) Patent No.: US 7,778,209 B2
(45) Date of Patent: Aug. 17, 2010

(54) PASSIVE ECHO CANCELLATION DEVICE AND SIGNAL TRANSMISSION METHOD THEREOF

(75) Inventors: Shian Ru Lin, Mingjian Township (TW); Chung Chan Huang, Jhubei (TW)

(73) Assignee: Realtek Semiconductor Corp., Hsinchu (TW)

( * ) Notice: Subject to any disclaimer, the term of this patent is extended or adjusted under 35 U.S.C. 154(b) by 250 days.

(21) Appl. No.: 11/962,096

(22) Filed: Dec. 21, 2007

(65) Prior Publication Data

US 2008/0151787 A1    Jun. 26, 2008

(30) Foreign Application Priority Data

Dec. 21, 2006   (TW) ............................... 95148109 A (51) Int. Cl.
*H04B 3/20* (2006.01)
(52) U.S. Cl. .................. 370/286; 370/276; 370/289
(58) Field of Classification Search ................ 370/276, 370/286, 289
See application file for complete search history.

(56) References Cited

U.S. PATENT DOCUMENTS

| | | | | |
|---|---|---|---|---|
| 4,087,654 A * | 5/1978 | Mueller | ............... | 379/406.08 |
| 4,131,767 A * | 12/1978 | Weinstein | ............... | 379/406.06 |
| 6,795,494 B1 * | 9/2004 | Phanse et al. | ............... | 375/219 |
| 6,947,773 B2 * | 9/2005 | Novorita et al. | ............... | 455/570 |
| 7,065,056 B2 * | 6/2006 | Glass | ............... | 370/286 |
| 7,349,480 B2 * | 3/2008 | Tsatsanis et al. | ............... | 375/257 |
| 7,554,933 B2 * | 6/2009 | Huang et al. | ............... | 370/286 |
| 2002/0009057 A1 * | 1/2002 | Blackwell et al. | ............... | 370/286 |
| 2002/0071400 A1 * | 6/2002 | Lee et al. | ............... | 370/286 |
| 2005/0018596 A1 * | 1/2005 | Washburn et al. | ............... | 370/201 |
| 2005/0031097 A1 * | 2/2005 | Rabenko et al. | ............... | 379/93.31 |
| 2005/0152262 A1 * | 7/2005 | Huang et al. | ............... | 370/201 |
| 2005/0232170 A1 * | 10/2005 | Chiu et al. | ............... | 370/276 |

* cited by examiner

*Primary Examiner*—Chi H Pham
*Assistant Examiner*—Robert Lopata
(74) *Attorney, Agent, or Firm*—Thomas, Kayden, Horstemeyer & Risley, LLP (57) ABSTRACT

The present invention refers to a passive echo cancellation device for use in a full-duplex communication system and its signal transceiving method. The full-duplex communication system comprises a transmitting end for sending a transmit signal to a wiring interface, and a receiving end for accepting a receive signal from the wiring interface. The passive echo cancellation device comprises an offset-signal-generating circuit and a passive echo cancellation circuit composed of a plurality of passive components. The offset-signal-generating circuit generates an offset signal according to the transmit signal. The passive echo cancellation circuit is serially connected between the wiring interface and the receiving end, and is connected with the offset-signal-generating circuit. The passive echo cancellation circuit receives the offset signal in such a manner that an echo signal contained in the receive signal coming from the wiring interface is cancelled by mean of the offset signal, so as to generate an output signal containing merely the signal characteristics of the receive signal.

23 Claims, 8 Drawing Sheets

PASSIVE ECHO CANCELLATION DEVICE AND SIGNAL TRANSMISSION METHOD THEREOF

BACKGROUND OF INVENTION

1. Field of the Invention

The present invention relates to communication systems, and more particularly, to a passive echo cancellation device and method.

2. Description of the Prior Art

With the progress of technologies, more and more applications of the Internet have been developed. In view of the growing needs for the bandwidth of networking, the packet transmission speed of the extensively used Ethernet has been enhanced from the previous speed of 10/100 Mbps to the current speed of more than 1 Gbps.

For example, in a commonly seen Gigabit Ethernet device having a transmission speed of 1 Gbps, each port thereof comprises four channels. Wherein, each channel has a transceiver for communicating with other network devices through a transmission medium such as a twisted pair cable. Further, each transceiver typically includes a transmitting end and a receiving end. The transmitting end is provided for processing data and then transmitting the processed data to a remote network device through the transmission medium, while the receiving end is provided for receiving and processing the data transmitted through and from the transmission medium. According to Gigabit Ethernet standard, each device communicates with other network devices by using the four channels simultaneously wherein each of the channels simultaneously performs data transmitting and receiving. In other words, the Gigabit Ethernet is a full duplex communication system.

The characteristic of a full duplex communication system such as the Gigabit Ethernet lies in that each of the channels simultaneously performs data transmitting and receiving. However, in such a system, when the network device is acquiring a signal Rx from one of the channels, a signal Tx simultaneously transmitted through the same channel may incur interference upon the received signal Rx. As a result, the integrity of the received signal is unrecognizable and this is generally referred to as echo impairment. In the attempt to minimize the effect of echo impairment, an echo cancellation circuit is commonly used in a network device so as to obviate the components of the transmitted signal from the signal the device receives.

Known echo cancellation circuits are typically equipped with active elements such as operational amplifiers and transistors. By using such active elements, an echo cancellation circuits can not only obviate the echo effects but also actively provide gain to the signal it receives. Nevertheless, the implement of these active elements brings the disadvantages of relatively complex construction, higher manufacturing costs and greater power consumption to the circuits.

SUMMARY OF INVENTION

It is therefore one of the objectives of the present invention to provide a passive echo cancellation device and a signal transceiving method thereof for a full duplex communication system. The present invention implements merely a plurality of passive elements and a simple circuit configuration to eliminate echo impairment in received signals. Also, effects of simplifying the circuit configuration, reducing the manufacturing costs and economizing power consumption can be accomplished.

In order to achieve the aforementioned objective, the present invention discloses a method for receiving and transmitting signals, comprising the steps of:

providing a receiving-and-transmitting route;

receiving a receive signal and transmitting a transmit signal through the receiving-and-transmitting route so as to generate an echo signal as a superimposition of the receive signal and the transmit signal;

providing an offset signal containing characteristics of the transmit signal; and using a passive echo cancellation circuit, which comprises merely passive elements, to eliminate the transmit signal contained in the echo signal according to the offset signal so as to generate an output signal containing merely signal characteristics of the receive signal.

In order to achieve the aforementioned objective, the present invention discloses a passive echo cancellation device for being used in a full duplex communication system, in which the full duplex communication system comprises a transmitting end for transmitting a transmit signal to a wiring interface and a receiving end for receiving a receive signal from the wiring interface, and the passive echo cancellation device comprises:

an offset-signal-generating circuit, for generating an offset signal corresponding to the transmit signal; and a passive echo cancellation circuit, comprising merely a plurality of passive elements, serially connected between the wiring interface and the receiving end, and connected to the offset-signal-generating circuit, for acquiring the offset signal and using the offset signal to offset an echo signal contained in the receive signal from the wiring interface so as to generate an output signal merely containing signal characteristics of the receive signal.

In one preferred embodiment, the transmit signal at the transmitting end is generated by a line driver and the offset-signal-generating circuit is a voltage-drop circuit serially connected between the transmitting end and the wiring interface.

In one preferred embodiment, the transmit signal at the transmitting end is generated by a current DAC and the offset-signal-generating circuit is a replica of the current DAC for generating the offset signal having a voltage value equal to a voltage value of the transmit signal.

In one preferred embodiment, the passive echo cancellation circuit further comprises:

a first passive element, having one end thereof coupled with a node between the transmitting end and the wiring interface;

a second passive element, having one end thereof coupled with an output of the offset-signal-generating circuit;

a third passive element, having one end thereof coupled with another output of the offset-signal-generating circuit; and a fourth passive element, having one end thereof coupled with another node between the transmitting end and the wiring interface;

wherein, the first passive element and the second passive element have their respective another ends connected with each other to form a first output terminal, while the third passive element and the fourth passive element have their respective another ends connected with each other to form a second output terminal, and the first and the second output terminals are coupled with the receiving end.

In one preferred embodiment, the first to fourth passive elements are either resistors or capacitors.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION

Figure 1A:
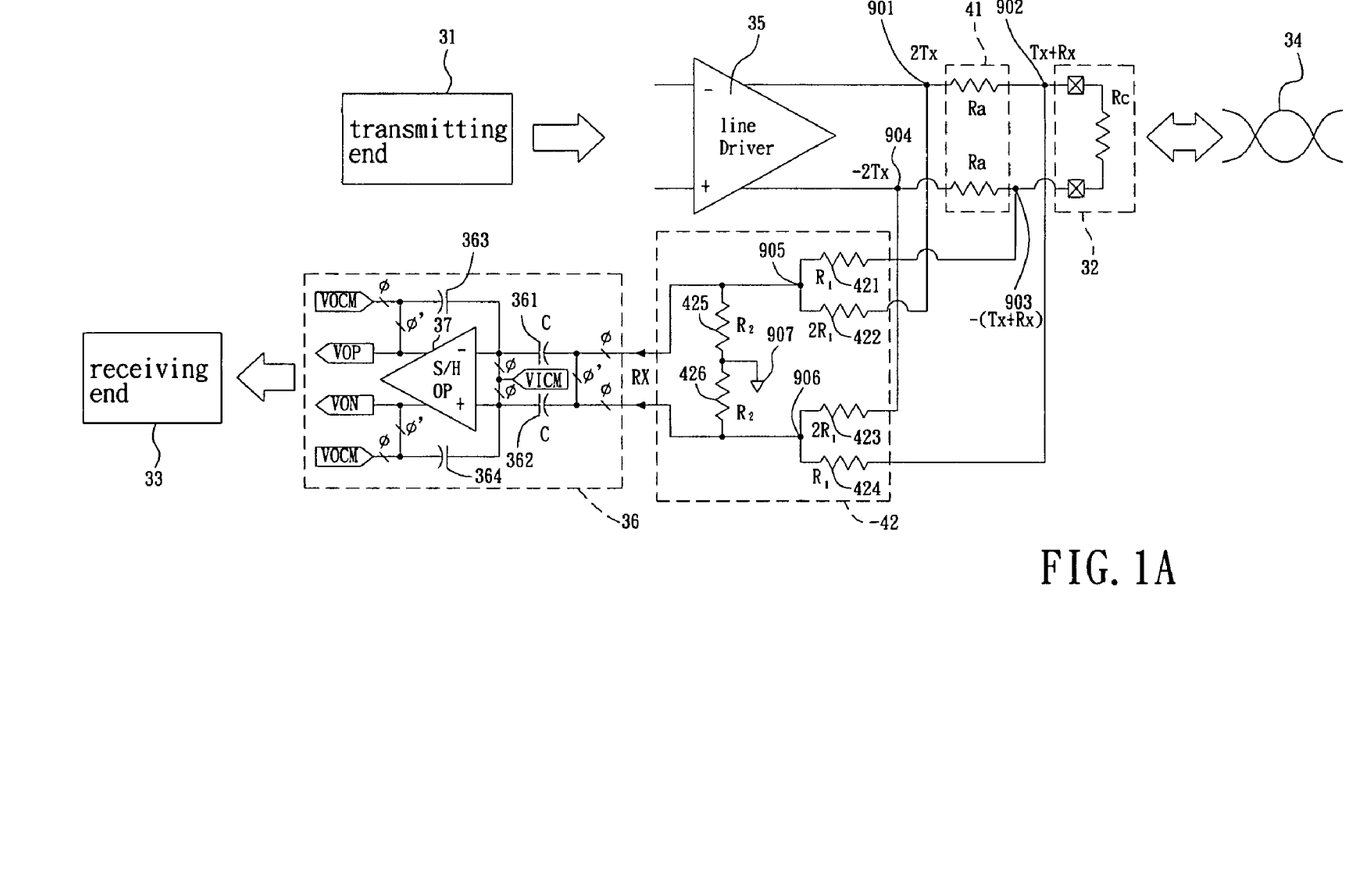
FIG. 1A is a circuit diagram of a passive echo cancellation device according to a first embodiment of the present invention.
Figure 1B:
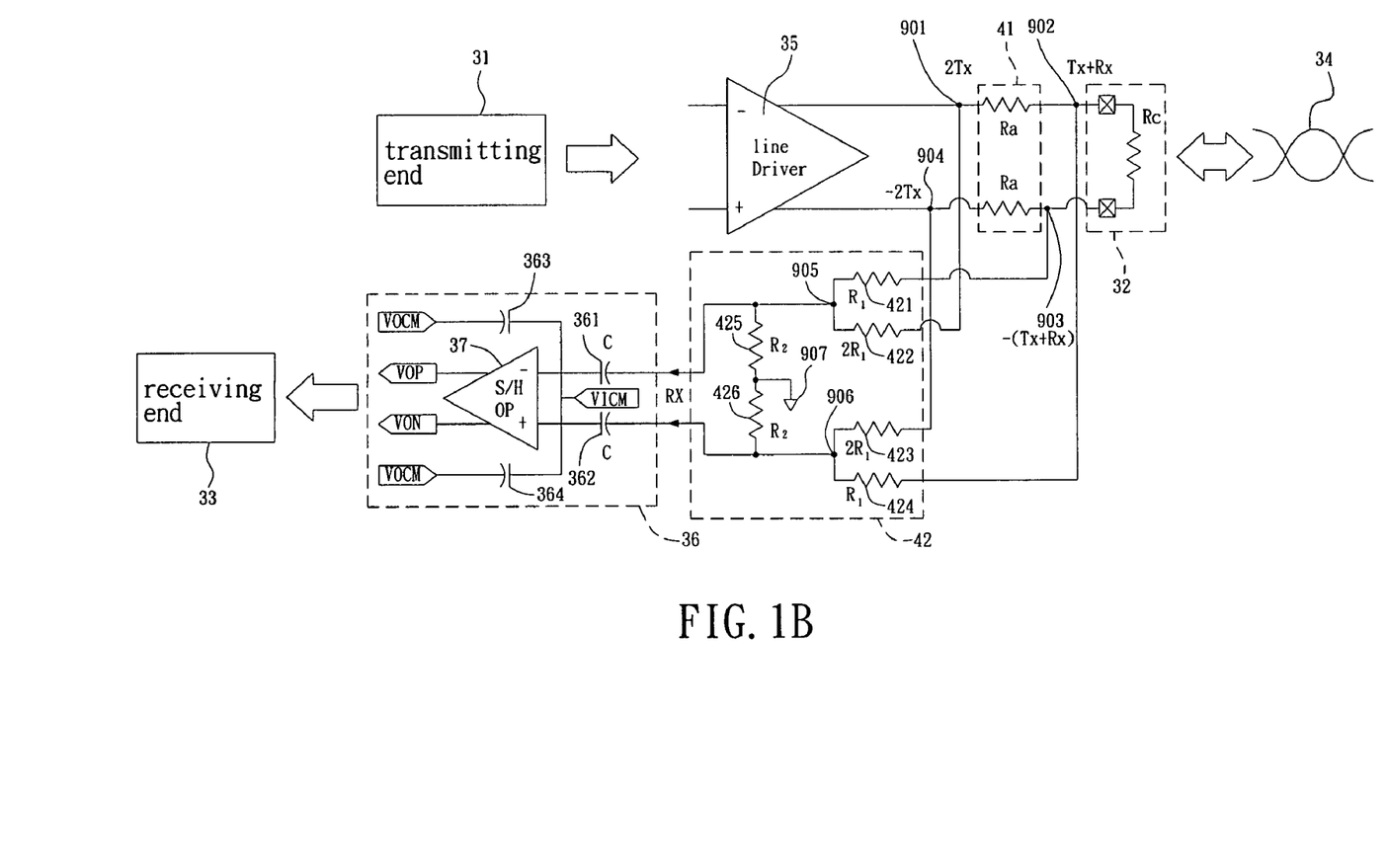
FIG. 1B is another circuit diagram of the passive echo cancellation device according to the first embodiment of the present invention showing the same in a sample mode.
Figure 1C:
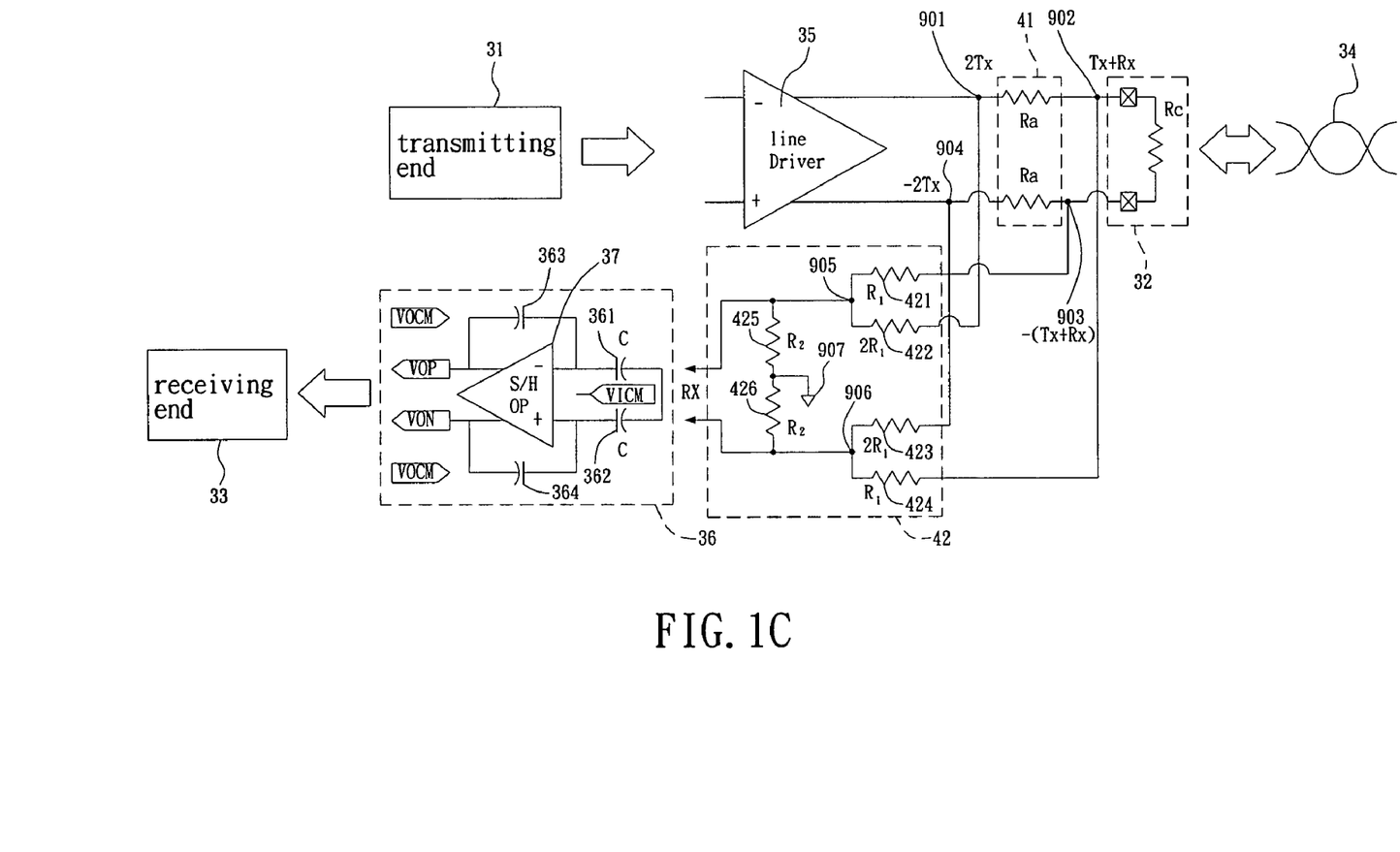
FIG. 1C is further another circuit diagram of the passive echo cancellation device according to the first embodiment of the present invention showing the same in a hold mode.

Please refer to FIGS. 1A, 1B and 1C. Therein, FIG. 1A is the circuit diagram of a passive echo cancellation device according to a first embodiment of the present invention. FIG. 1B is another circuit diagram showing the passive echo cancellation device of FIG. 1A under a sample mode. FIG. 1C is further another circuit diagram showing the passive echo cancellation device of FIG. 1A under a hold mode.

The full duplex communication system as shown in FIGS. 1A, 1B and 1C comprises a transmitting end 31 for transmitting a transmit signal to a wiring interface 32 and a receiving end 33 for receiving a receive signal from the wiring interface 32. The transmitting end 31 may be equipped with elements including a DAC (digital-to-analog converter). The receiving end 33 may be equipped with elements including an analog front end circuit (AFE) and an ADC (analog-to-digital converter). The wiring interface 32 is provided for being connected with a twisted pair 34 and thereby further connected with another remote network device. Since the implement of the described transmitting end 31, wiring interface 32, and receiving end 33 are well known by those skilled in the art, the same will not be discussed in greater detail herein.

According to the first embodiment illustrated in FIG. 1A, in addition to the components described above, for achieving the purpose of eliminating echo, a voltage-drop circuit 41 and a passive echo cancellation circuit 42 are also provided. In the present invention, an output terminal of the transmitting end 31 has a line driver 35 for acting as a DAC of the transmitting end 31, so as to generate the transmit signal and realize digital-to-analog conversion by the line driver 35. As this technique is well known by people skilled in the art, the detailed structure and operational principle thereof is not discussed herein. In the present embodiment, the resistance value of two resistors Ra in the voltage-drop circuit 41 are set as half of an equivalent resistance value Rc of the wiring interface 32. For instance, when Ra is 50 ohms and Rc is 100 ohms, according to the Voltage Dividing Rule, if the transmit signal transmitted from the second and third nodes 902, 903 is Tx, the signal output to the first and fourth nodes 901, 904 from the line driver 35 becomes 2Tx, which has an amplitude twice the Tx. When an externally received signal Rx is also transmitted to the second and third nodes 902, 903 through the wiring interface 32, the signal observed on the second and third nodes 902, 903 is actually a superimposition of the transmit signal Tx and the receive signal Rx, namely Tx+Rx.

As such, since signals at two ends of the voltage-drop circuit 41 are respectively the superimposition of the transmit signal Tx and the receive signal Rx, namely Tx+Rx, and the signal having the amplitude proportional to that of the transmit signal with a fixed rate (i.e., twice), namely 2Tx, the signals at the two ends of the voltage-drop circuit 41 can be extracted for conducting echo cancellation, so as to derive the actual receive signal Rx. In the present embodiment, the voltage-drop circuit 41 substantively works as an offset-signal-generating circuit of the disclosed passive echo cancellation device; that is to say, the voltage-drop circuit 41 can generate an offset signal containing merely the component of the transmit signal Tx. As shown in FIG. 1A, the passive echo cancellation circuit 42 of the present embodiment is composed of a plurality of passive elements and is serially connected between the wiring interface 32 and the receiving end 33, and meanwhile also positioned between the DAC of the transmitting end 31 and the ADC of the receiving end 33. The passive echo cancellation circuit 42 comprises a plurality of resistors 421~426 (successively named as a first resistor through a sixth resistor) and adequate circuit connections.

Referring to the drawings, an input end of the first resistor 421 is coupled with the third node 903 between the voltage-drop circuit 41 and the wiring interface 32. An input end of the second resistor 422 is coupled with a first node 901 between the voltage-drop circuit 41 and the transmitting end 31. An input end of the third resistor 423 is coupled with a fourth node 904 between the voltage-drop circuit 41 and the transmitting end 31. An input end of the fourth resistor 424 is coupled with the second node 902 between the voltage-drop circuit 41 and the wiring interface 32. The first resistor 421 and the second resistor 422 have their respective another ends connected with each other to form a first output terminal (a fifth node 905), while the third resistor 423 and the fourth resistor 424 have their respective another ends connected with each other to form a second output terminal (a sixth node 906). Further, the first and second output terminals are coupled with the receiving end 33 through a sample-and-hold circuit 36. Besides, the fifth resistor 425 and the sixth resistor 426 have their respective one ends connected to the first and second output terminals, respectively, and have their respective another ends connected to ground 907.

In the present embodiment, for effectively eliminating the effect that the transmit signal Tx brings to the receive signal Rx, the signals, 2Tx and Tx+Rx, at the two ends of the voltage-drop circuit 41 are inverted and input to the echo cancellation circuit 42 as described above. Further, for compensating the proportional difference of the components of the transmit signal (i.e., twice), when resistance values of the first resistor 421 and the fourth resistor 424 are both set as $R_1$, resistance values of the second resistor 422 and the third resistor 423 are both set as $2R_1$. Moreover, when resistance values of the fifth resistor 425 and the sixth resistor 426 are both set as $R_2$, based on the voltage dividing rule, one can derive a signal value at the sixth node 906 through the following formula (1):

$$-2Tx \times \frac{R_1 // R_2}{R_1 // R_2 + 2R_1} + (Tx + Rx) \times \frac{(2R_1) // R_2}{(2R_1) // R_2 + R_1} = \qquad (1)$$

$$-2Tx \times \frac{R_2}{2R_1 + 3R_2} + (Tx + Rx) \times \frac{2R_2}{2R_1 + 3R_2} = \frac{2R_2}{2R_1 + 3R_2}$$

Similarly, a signal value at the fifth node 905 can be derived from the following formula (2):

$$2Tx \times \frac{R_1 // R_2}{R_1 // R_2 + 2R_1} - (Tx + Rx) \times \frac{(2R_1) // R_2}{(2R_1) // R_2 + R_1} = \qquad (2)$$

$$2Tx \times \frac{R_2}{2R_1 + 3R_2} - (Tx + Rx) \times \frac{2R_2}{2R_1 + 3R_2} = -\frac{2R_2}{2R_1 + 3R_2} Rx$$

In other words, after the signal passes through the passive echo cancellation circuit 42, an output signal proportional to the receive signal Rx (–Rx) is obtained, so that the echo impairment contained in the signal originally received can be offset and echo cancellation is achieved. Since only passive elements such as resistors and a simple circuit configuration are used in the passive echo cancellation circuit 42 of the present embodiment, as compared with the prior arts that use active elements, this embodiment provides the advantages of a relatively simple configuration, lower costs and economized power consumption.

Please note that in the passive echo cancellation circuit 42 of the present embodiment, the fifth and sixth resistors 425, 426 and/or the first, second, third, and fourth resistors 421~424 can be designed as variable resistors so that the a desired voltage gain can be determined by adjusting a ratio between the resistance values $R_1$ and $R_2$. Although with the passive echo cancellation circuit 42 being fully realized by passive elements, it can only provide a voltage gain of a value lower than 1, in view of the progress of the manufacturing processes of integrated circuits, operational voltages tends to become smaller and smaller. Therefore, for advanced manufacturing processes, such as 0.18 μm standard CMOS process or more advanced, i.e., smaller processes, there is no need to amplify the signals received; on the contrary, the amplitudes of the received signals have to be reduced, or attenuated (namely the voltage gain with a value lower than 1 is employed), so as to avail later stage circuit operation. Hence, the passive echo cancellation circuit 42 of the present embodiment is especially ideal for more advanced manufacturing processes.

The output signal generated under the processing of the passive echo cancellation circuit 42, which only contains the components of the receive signal Rx, is further transmitted to a first stage circuit of the receiving end 33, that is, the sample-and-hold circuit 36 in the present embodiment. As can be understood by one skilled in the art, the sample-and-hold circuit 36 is generally the first stage circuit of the ACD at the receiving end 33. The sample-and-hold circuit 36 switches a plurality of switches by two clock signals φ, φ' having opposite phases, to alternately operate in either a sample mode or a hold mode. In the sample mode, the sample-and-hold circuit 36 samples with capacitive effect a resultant output signal of the former stage circuit, and in the hold mode, the sample-and-hold circuit 36 transmits the sampled resultant output signal to a later stage circuit for further processing (e.g., analog-to-digital conversion).

Please refer to FIG. 1B. When the passive echo cancellation device of the present invention operates in the sample mode, the receive signal from the output terminals of the passive echo cancellation circuit 42 (the sixth and fifth nodes 906, 905) are coupled with the input ends, VICM, and VOCM (i.e., common mode voltages at the input ends and output terminals) of the status amplifier 37, respectively, through capacitors C (361, 362) of a switching circuit 36. After being gain-adjusted by the status amplifier 37, the receive signal is then transmitted to the receiving end 33 through VOP and VON for signal processing of analog-to-digital conversion.

As shown in FIG. 1C, when the passive echo cancellation device of the present invention operates in the hold mode, coupling between the output terminals (the sixth and fifth nodes 906, 905) of the passive echo cancellation circuit 42 and the two capacitors C (361, 362) of the sample-and-hold circuit 36 is broken (opened), and couplings between the VICM and VOCM and the input ends of the status amplifier 37 are also broken. At this time, the status amplifier 37 has its output ends coupled with its input ends through capacitors 363, 364, so as to achieve the purpose of holding the signal.

The structure and operation of the sample-and-hold circuit are well known by people skilled in the art and thus are not discussed in detail herein. In the first embodiment illustrated in FIGS. 1A through 1C, the sample-and-hold circuit 36 is used as the first stage circuit of the ADC of the receiving end, for switching the operation between the sample mode and the hold mode of signal receiving. However, one can also implement other conventional techniques instead, such as, but not limited to, an MDAC1 circuit.

Figure 2A:
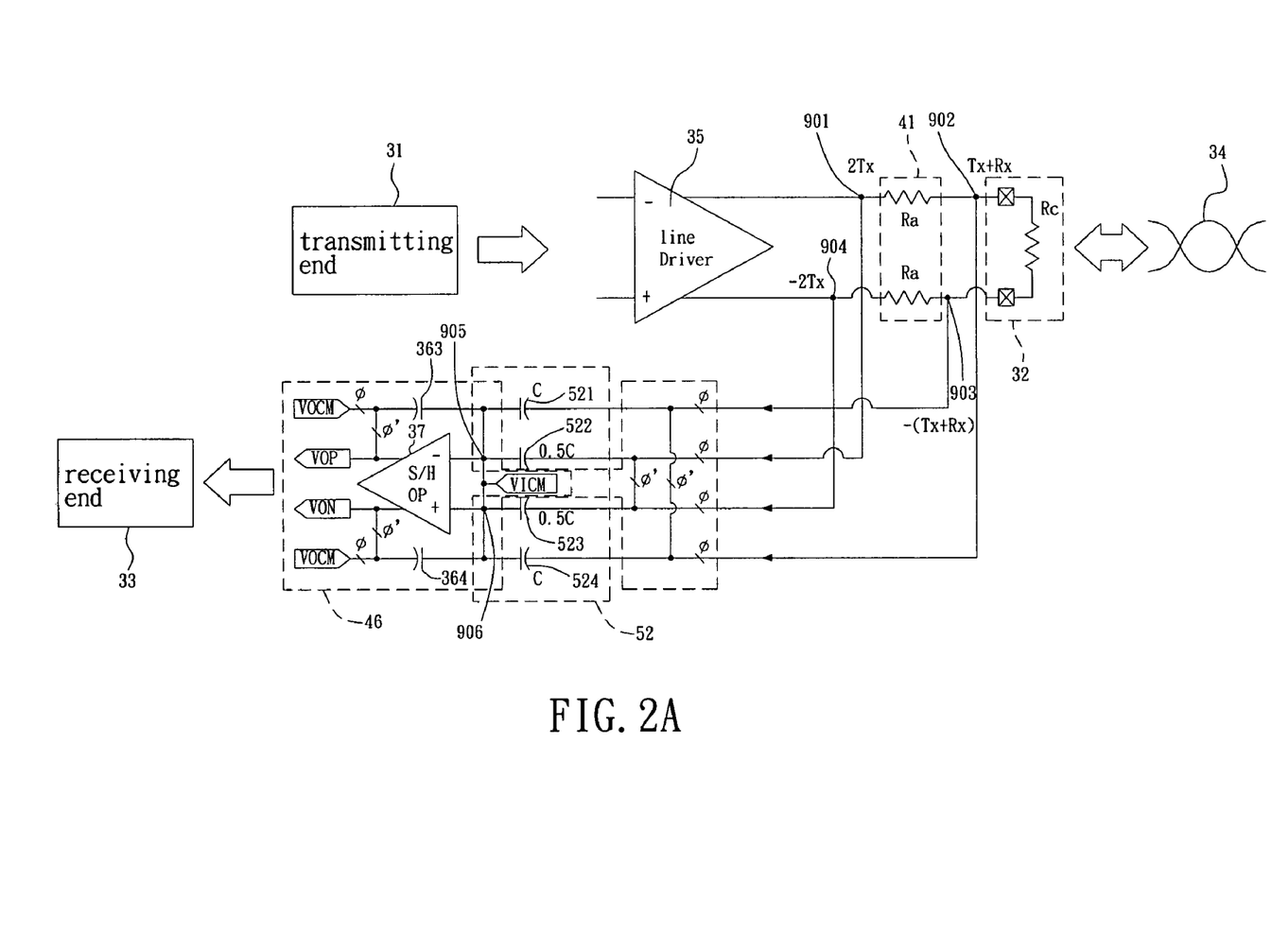
FIG. 2A is a circuit diagram of a passive echo cancellation device according to a second embodiment of the present invention.
Figure 2B:
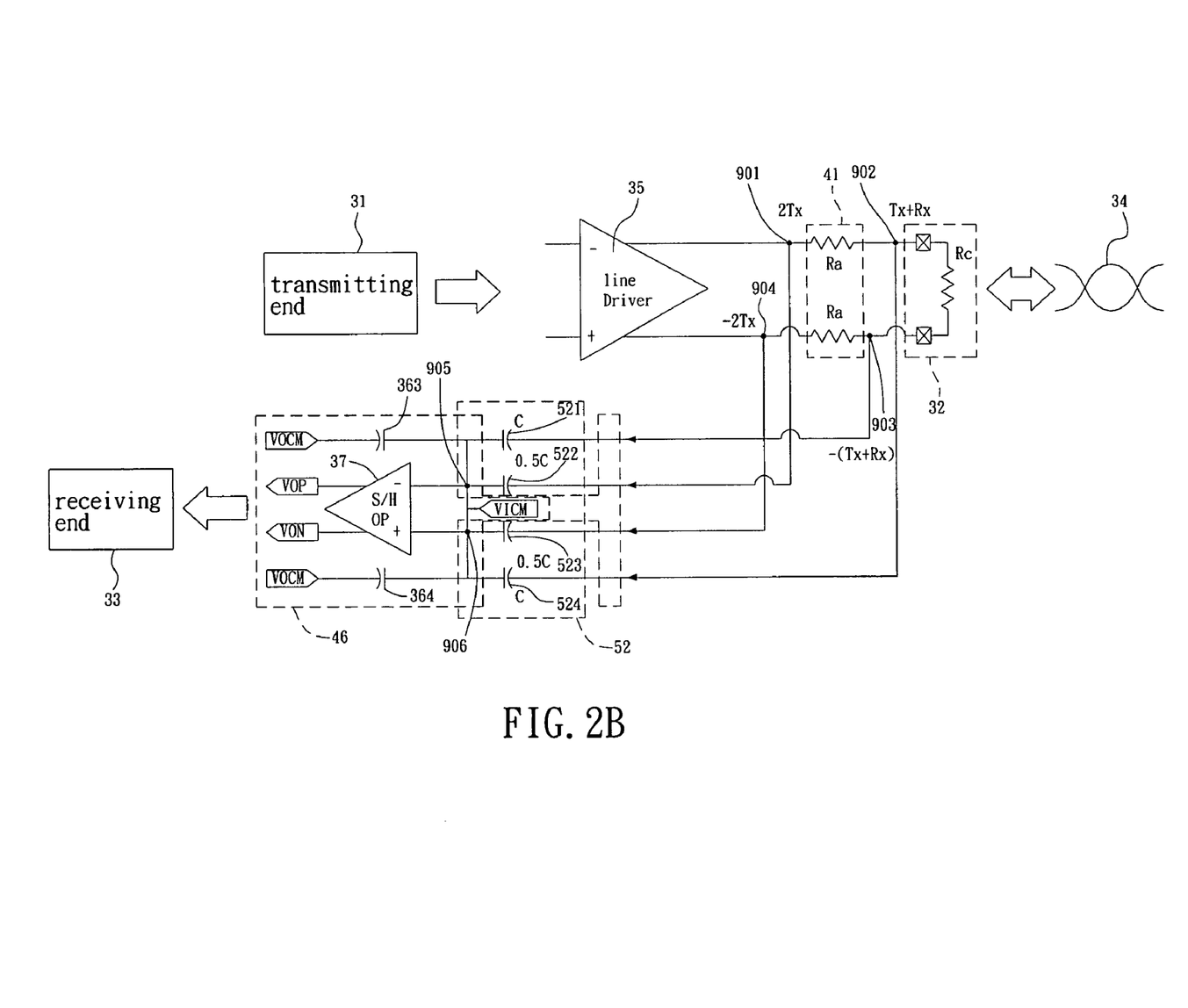
FIG. 2B is another circuit diagram of the passive echo cancellation device according to the second embodiment of the present invention showing the same in a sample mode.
Figure 2C:
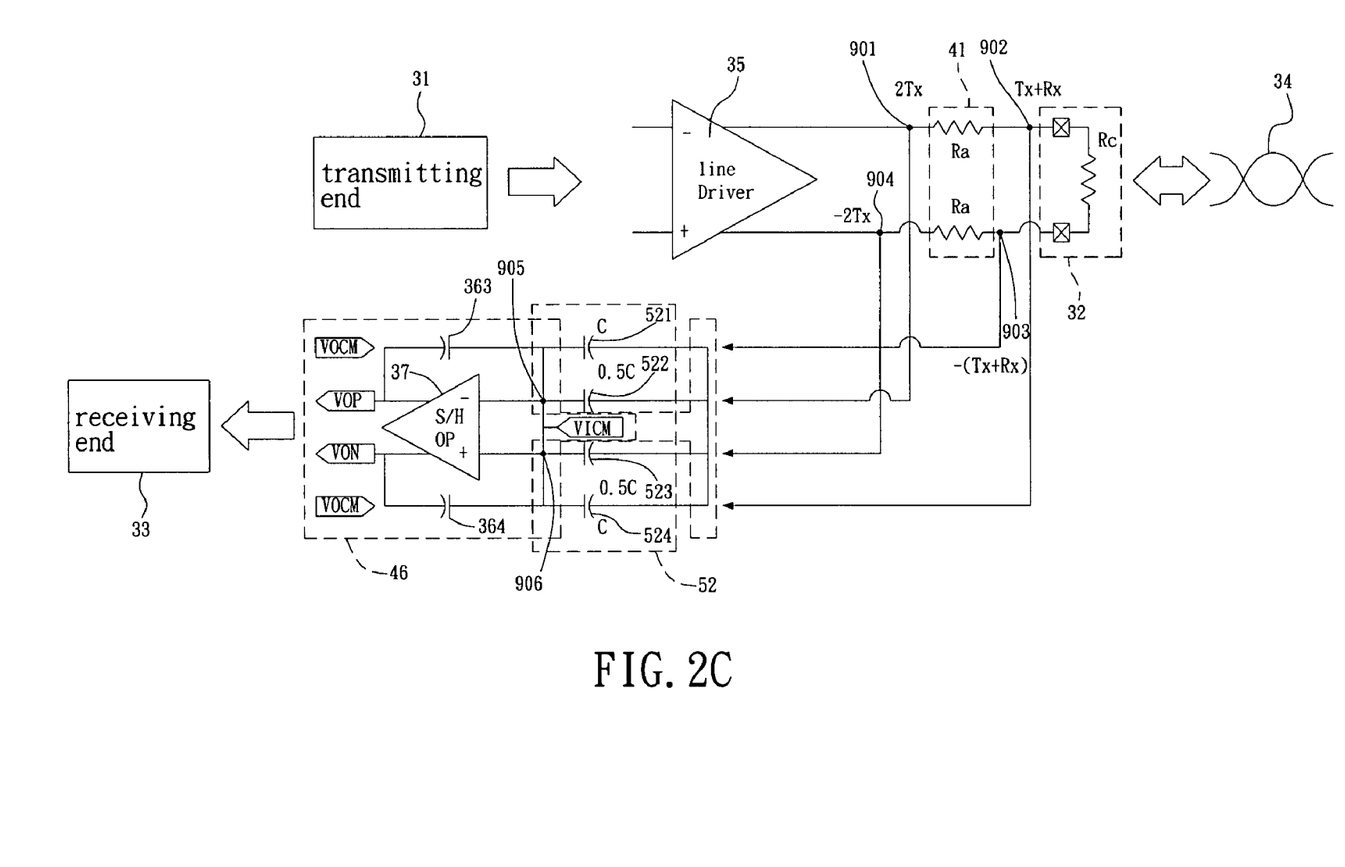
FIG. 2C is further another circuit diagram of the passive echo cancellation device according to the second embodiment of the present invention showing the same in a hold mode.

Please refer to FIGS. 2A, 2B and 2C. Wherein, FIG. 2A is the circuit diagram of a passive echo cancellation device according to a second embodiment of the present invention. FIG. 2B is another circuit diagram showing the passive echo cancellation device of FIG. 2A under a sample mode. FIG. 2C is further another circuit diagram showing the passive echo cancellation device of FIG. 2A under a hold mode. The detailed configurations, operational mechanism and effects of the transmitting end 31, wiring interface 32, receiving end 33, line driver 35, and voltage-drop circuit 41 (i.e., the offset-signal-generating circuit) in the second embodiment, which are similar to those described in the first embodiment and shown in FIGS. 1A to 1C, will not be discussed in greater detail herein.

According to the second embodiment illustrated in FIGS. 2A to 2C, the disclosed passive echo cancellation device 52 further comprises a plurality of capacitors 521~524 (successively named as a first through a fourth capacitor), with adequate circuit connections. An input end of the first capacitor 521 is coupled with the third node 903 between the voltage-drop circuit 41 and the wiring interface 32. An input end of the second capacitor 522 is coupled with the first node 901 between the voltage-drop circuit 41 and the transmitting end 31. An input end of the third capacitor 523 is coupled with the fourth node 904 between the voltage-drop circuit 41 and the transmitting end 31. An input end of the fourth capacitor 524 is coupled with the second node 902 between the voltage-drop circuit 41 and the wiring interface 32.

For effectively eliminating the effect that the transmit signal Tx brings to the receive signal Rx, the signals 2Tx and Tx+Rx at the two ends of the voltage-drop circuit 41 are inverted and input into the echo cancellation circuit 52 as described above. Further, for compensating the proportional difference of the components of the transmit signal (i.e., twice), when capacitance values of the first capacitor 521 and the fourth capacitor 524 are both set as C, capacitance values of the second capacitor 522 and the third capacitor 523 are both set as 0.5 C, namely a relationship of twice the amount therebetween. Then, the first capacitor 521 and the second capacitor 522 have their respective another ends connected with each other to form a first output terminal (a fifth node 905), while the third capacitor 523 and the fourth capacitor 524 have their respective another ends connected with each other to form a second output terminal (a sixth node 906). Further, the first and second output terminals (the fifth and sixth nodes 905, 906) are coupled with the receiving end 33 through a sample-and-hold circuit 46.

Through the aforementioned circuit configuration, according to voltage dividing rule, one can easily derive the effect imposed upon an electric quantity at the sixth node 906 brought by the signal values at the two ends of the voltage-drop circuit 41 processed by the echo cancellation circuit 52, with the following formula (3):

$$-2Tx \times 0.5C + (Tx+Rx) \times C = Rx \cdot C \quad (3)$$

Similarly, the effect imposed upon an electric quantity at the fifth node 905 can be derived from the following formula (4):

$$2Tx \times 0.5C - (Tx+Rx) \times C = -Rx \cdot C \quad (4)$$

Through the above formulae (3) and (4), it is learned that in the passive echo cancellation device of the second embodiment, the signal values at the first and second output terminals (the fifth and sixth nodes 905, 906), as those in the first embodiment, are proportional to the receive signal Rx (−Rx), and that the echo impairment originally contained in the received signal has been eliminated by the disclosed passive echo cancellation device. Since the passive echo cancellation circuit 52 of the present embodiment implements only passive elements such as capacitors and a simple circuit configuration, as compared with the prior arts that use active elements, it has the advantages of a relatively simple configuration, lower costs, and economized power consumption.

Please note that in the present embodiment, the capacitors 363, 364 and/or the first, second, third, and fourth capacitors 521~524 of the sample-and-hold circuit 46 can be designed as variable capacitors, so that the a desired voltage gain can be determined by adjusting a ratio between the capacitance values. Although with the passive echo cancellation circuit 52 being fully realized by the passive elements, it can only provide a voltage gain of a value lower than 1, as discussed previously, for advanced manufacturing processes, there is no need to amplify the signals received thereby; on the contrary the amplitudes of the received signals usually need to be reduced (namely the voltage gain with a value lower than 1 is employed), so as to avail further circuit operation. Hence, the passive echo cancellation circuit 52 of the present embodiment is especially ideal for more advanced manufacturing processes.

The output signal generated under the processing of the passive echo cancellation circuit 52, which only contains the component of the receive signal Rx, is further transmitted to a first stage circuit of the receiving end 33, that is, the sample-and-hold circuit 46 in the present embodiment. Though the structure of the sample-and-hold circuit 46 in the present embodiment, which incorporates the echo cancellation circuit constructed with the capacitors 521~524, is partially different from the sample-and-hold circuit 36 of the first embodiment, the practice and principle of the sample-and-hold circuit are generally known by people skilled in the art, and therefore the detailed construction as well as the operational principle will not be discussed in greater detail herein.

Figure 3:
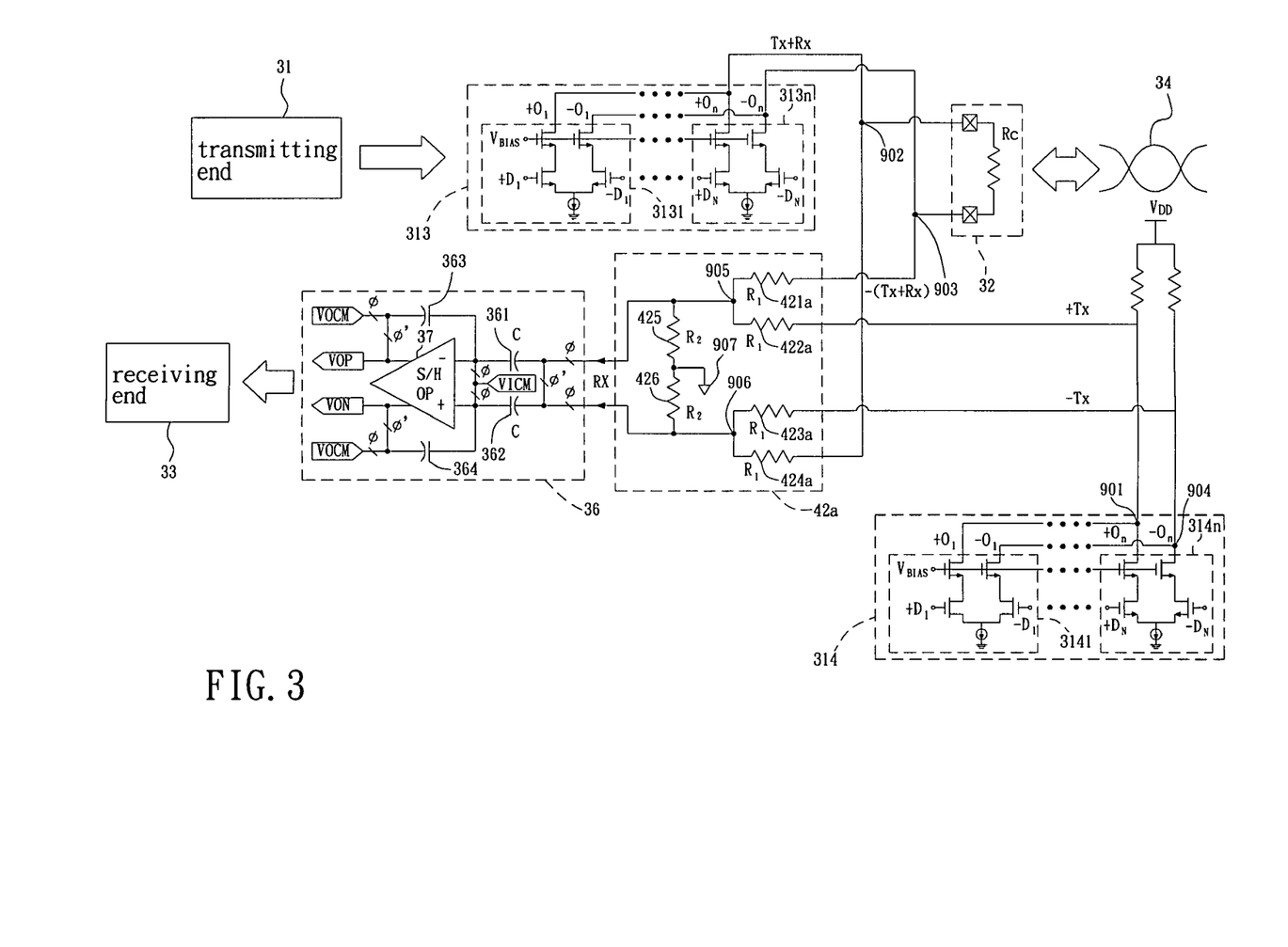
FIG. 3 is a circuit diagram of the passive echo cancellation device according to a third embodiment of the present invention.

Please refer to FIG. 3 for the circuit diagram of a passive echo cancellation device according to a third embodiment of the present invention. Since the detailed configurations, operational mechanism and effects of the wiring interface 32, receiving end 33, sample-and-hold circuit 36 and echo cancellation circuit 42a in the present embodiment are similar to those described in the first embodiment and shown in FIG. 1A, the same names and numerals are imparted to the same elements and the configurations of those elements are not to be discussed. Rather, the following description will be directed to the differences between the third embodiment and the previous embodiments.

As shown in FIG. 3, in the third embodiment of the passive echo cancellation device according to the present invention, a DAC provided in the transmitting end 31a can be realized through a current DAC 313 and a replica 314 of the current DAC 313. In the present embodiment, the replica 314 is substantively an offset-signal-generating circuit of the disclosed passive echo cancellation device. In other words, the replica 314 can generate an offset signal (namely a replica signal) containing only the component of the transmit signal Tx generated by the current DAC 313. Besides, the first through fourth resistors 421a~424a of the echo cancellation circuit 42a have the same resistance value R1.

In the third embodiment, the current DAC 313 comprises a plurality of converting units 3131~313n. Each of the converting units 3131~313n is capable of conducting D/A conversion to one bit in the digital signal ($D_1 \ldots D_N$) that is to be converted. For example, if the digital signal to be converted is an 8-bit signal, then n=8. The two analog signal output terminals +O1~+On, −O1~−On of each of the converting units 3131~313n respectively converge at the second and third nodes 902, 903. The digital signal from the transmitting end 31 is converted into an analog signal by the current DAC 313 and then transmitted to a remote network device through the wiring interface 32 and the twisted pair 34 connected therewith. The second and third nodes 902, 903 are respectively coupled with input ends of the fourth resistor 424a and the first resistor 421a of the passive echo cancellation circuit 42a of the present invention.

The replica 314 is substantially identical to the current DAC 313 and also comprises a plurality of converting units 3141~314n. The replica 314 can generate an analog signal identical and synchronous to that of the current DAC 313. However, analog signal output terminals +O1~+On, −O1~−On of the replica 314 are not connected to the wiring interface 32 and no signal from the replica 314 is transmitted to a remote network device. Conversely, the analog signal output terminals +O1~+On, −O1~−On, of the replica 314 respectively converge at the first and fourth nodes 901, 904, namely the second and third resistors 422a, 423a of the disclosed passive echo cancellation circuit 42a. Note that for effectively replicating the integrity of the transmit signal Tx, loadings of the replica 314 at the first and fourth nodes 901, 904 are to be set as equal to loadings of the current DAC 313 at the second and third nodes 902, 903.

As previously discussed, in virtue of the full duplex characteristic of the Gigabit Ethernet, the analog signals received at the second and third nodes 902, 903 respectively contain echoes +Rx+Tx and −Rx−Tx, whereas at the first and fourth nodes 901, 904, only the signals +Tx and −Tx from the replica 314 are observed. Obviously, the signal −Rx can be derived at the first output terminal (the fifth node 905) of the disclosed passive echo cancellation circuit 42a according to the third embodiment because the signal −Rx−Tx at the third node 903 and the signal +Tx at the first node 901 mutually offset. On the other hand, the signal +Rx can be derived at the second output terminal (the sixth node 906) because the signal +Rx+T at the second node 902 and the signal −Tx at the fourth node 904 mutually offset. Thereupon, the effect of eliminating echo impairment from the receive signal can be achieved by simply using the passive resistors and adequate circuit connections.

Figure 4:
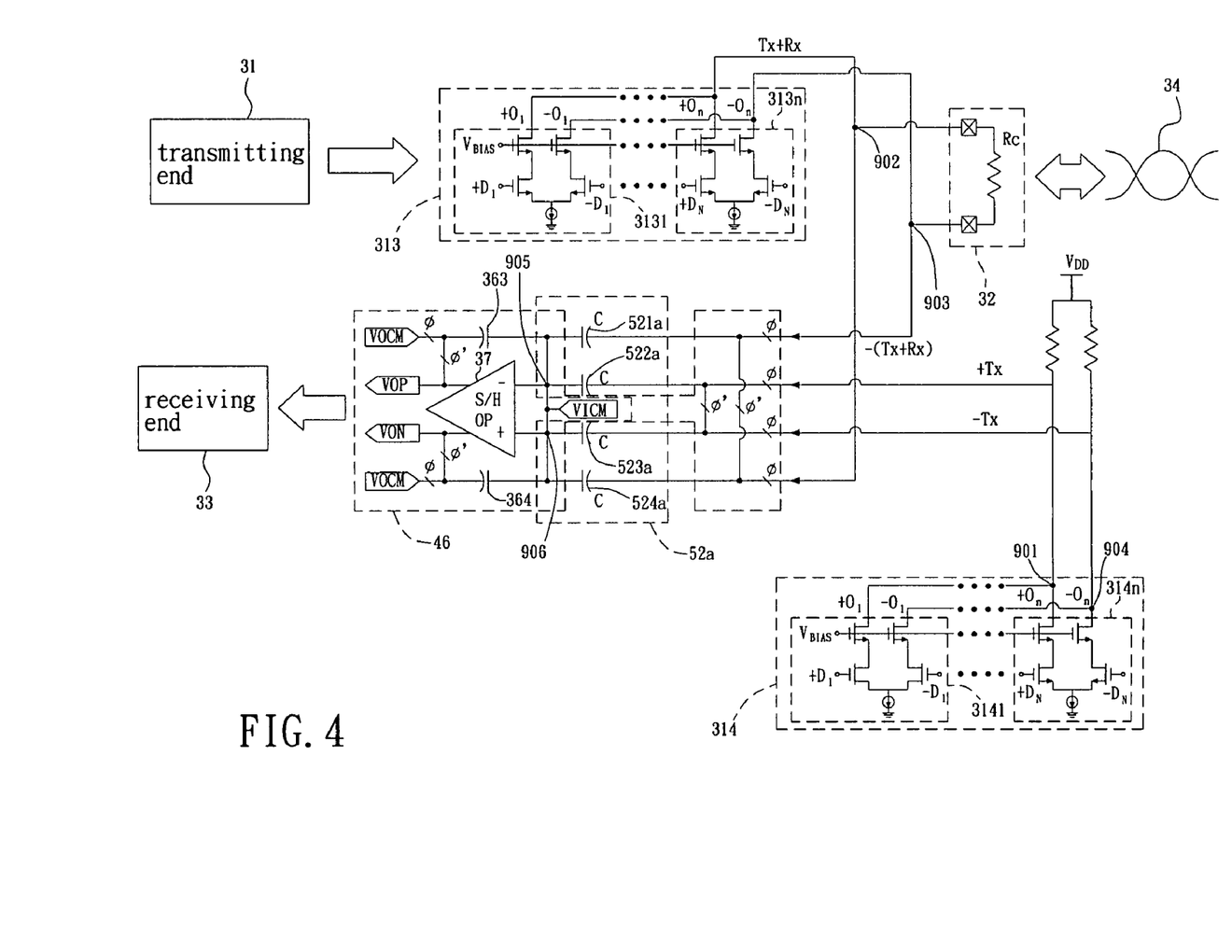
FIG. 4 is a circuit diagram of the passive echo cancellation device according to a fourth embodiment of the present invention.

FIG. 4 provides a circuit diagram of the passive echo cancellation device according to a fourth embodiment of the present invention. The fourth embodiment is similar to the third embodiment, while the only difference therebetween is that in the fourth embodiment shown in FIG. 4, the passive echo cancellation device is constituted by a plurality of capacitors 521a~524a as illustrated in FIG. 2A (successively named as a first through a fourth capacitor) with adequate circuit connections. Therein, the capacitors 521a~524a have the same capacitance value C. Further, an input end of the first capacitor 521a is connected to the third node 903, i.e., between a signal output terminal of the current DAC 313 and the wiring interface 32. An input end of the second capacitor 522a is connected to the first node 901, i.e., one of the output terminals +O1~+On of the replica 314. An input end of the third capacitor 523a is connected to the fourth node 904, i.e., another of the output terminals −O1~−On of the replica 314. An input end of the fourth capacitor 524a is connected to the second node 902, i.e., between the signal output terminal of the current DAC 313 and the wiring interface 32. Apparently, the signal −Rx can be derived at the first output terminal (the fifth node 905) of the passive echo cancellation circuit 52a because the signal −Rx−Tx at the third node 903 and the signal +Tx at the first node 901 mutually offset. On the other hand, the signal +Rx can be derived at the second output terminal (the sixth node 906) because the signal +Rx+Tx at the second node 902 and the signal −Tx at the fourth node 904 mutually offset. Thereupon, the effect of eliminating echo impairment from the received signal can be achieved by simply using the passive resistors and adequate circuit connections.

It is learned from the above embodiments that the passive echo cancellation device needs only a plurality of passive elements and adequate circuit connections to achieve the objective of eliminating echo. Hence, as compared with the prior arts that use active elements such as operational amplifiers and transistors, the passive echo cancellation device of the present invention has the significant advantages of economizing power consumption, simplifying circuit configuration, and reducing manufacturing costs. The effects of the disclosed passive echo cancellation device on saving power consumption and costs are even more conspicuous on network devices that have plural communication ports (e.g., multi-port switches). Though the prior arts using active elements to eliminate echo provide the function of actively gaining the received signal, in the world of semiconductor manufacturing process for integrated circuits, integrated circuits produced through more advanced manufacturing process (e.g., 0.18 μm standard CMOS process or more advanced) require lower operational voltages, and therefore voltage gains with values less than 1 become less wanted. In other words, the passive echo cancellation device of the present invention is preferable to prior arts for integrated circuits produced by more advanced semiconductor manufacturing process.

Although particular embodiments of the invention have been described in detail for purposes of illustration, it will be understood by one of ordinary skill in the art that numerous variations will be possible to the disclosed embodiments without going outside the scope of the invention as disclosed in the claims.

What is claimed is:

1. A passive echo cancellation device for being used in a full duplex communication system, in which the full duplex communication system comprises a transmitting end for transmitting a transmit signal to a wiring interface and a receiving end for receiving a receive signal from the wiring interface, and the passive echo cancellation device comprises:
   a passive echo cancellation circuit composed of a plurality of passive elements, serially connected between the wiring interface and the receiving end, and positioned between the transmitting end and the receiving end such that the passive echo cancellation circuit is capable of acquiring a signal from the transmitting end and using the signal to offset an echo signal contained in the receive signal from the wiring interface.

2. The passive echo cancellation device of claim 1, wherein said passive elements are resistors.

3. The passive echo cancellation device of claim 1, wherein said passive elements are capacitors.

4. The passive echo cancellation device of claim 1, further comprising a voltage-drop circuit which is serially connected between the transmitting end and the wiring interface;
   wherein a voltage value of the transmit signal at an end of the voltage-drop circuit connected to the transmitting end is proportional to a voltage value of the transmit signal at another end of the voltage-drop circuit connected to the wiring interface with a predetermined rate, which is greater than 1.

5. The passive echo cancellation device of claim 4, further comprising a line driver, which is serially connected between the transmitting end and the voltage-drop circuit for generating the transmit signal having the voltage value with the predetermined rate.

6. The passive echo cancellation device of claim 4, wherein the voltage-drop circuit is composed of resistors.

7. The passive echo cancellation device of claim 6, wherein the passive echo cancellation circuit further comprises:
   a first resistor, having one end thereof coupled with a third node between the voltage-drop circuit and the wiring interface;
   a second resistor, having one end thereof coupled with a first node between the voltage-drop circuit and the transmitting end;
   a third resistor, having one end thereof coupled with a fourth node between the voltage-drop circuit and the transmitting end; and
   a fourth resistor, having one end thereof coupled with a second node between the voltage-drop circuit and the wiring interface;
   wherein, a resistance value of the second resistor is equal to a resistance value of the third resistor, and a resistance value of the first resistor is equal to a resistance value of the fourth resistor, while the resistance value of the second resistor is proportional to the resistance value of the first resistor with the predetermined rate;
   wherein, the first resistor and the second resistor have their respective another ends connected with each other to form a first output terminal, while the third resistor and the fourth resistor have their respective another ends connected with each other to form a second output terminal, and the first and the second output terminals are coupled with the receiving end.

8. The passive echo cancellation device of claim 7, wherein the passive echo cancellation circuit further comprises a fifth resistor and a sixth resistor, in which the fifth and sixth resistors have their respective one ends connected to the first and second output terminals, respectively, and have their respective another ends connected to a ground, wherein the fifth resistor has a resistance value equal to a resistance value of the sixth resistor.

9. The passive echo cancellation device of claim 6, wherein the passive echo cancellation circuit further comprises:
a first capacitor, having one end thereof coupled with a third node between the voltage-drop circuit and the wiring interface;
a second capacitor, having one end thereof coupled with a first node between the voltage-drop circuit and the transmitting end;
a third capacitor, having one end thereof coupled with a fourth node between the voltage-drop circuit and the transmitting end; and
a fourth capacitor, having one end thereof coupled with a second node between the voltage-drop circuit and the wiring interface;
wherein, a capacitance value of the second capacitor is equal to a capacitance value of the third capacitor and a capacitance value of the first capacitor is equal to a capacitance value of the fourth capacitor while the capacitance value of the second capacitor is proportional to the capacitance value of the first capacitor with the predetermined rate;
wherein, the first capacitor and the second capacitor have their respective another ends connected with each other to form a first output terminal, while the third capacitor and the fourth capacitor have their respective another ends connected with each other to form a second output terminal, and the first and the second output terminals are coupled with the receiving end.

10. The passive echo cancellation device of claim 1, further comprising a sample-and-hold circuit, which is serially connected between the passive echo cancellation circuit and the receiving end for switching between a sample mode and a hold mode.

11. The passive echo cancellation device of claim 10, wherein the sample-and-hold circuit further comprises a status amplifier and a plurality of capacitors.

12. The passive echo cancellation device of claim 1, further comprising a current DAC and a replica of the current DAC, wherein the current DAC is furnished in the transmitting end for outputting an analog signal to the wiring interface, and said passive echo cancellation circuit further comprises:
a first resistor, having one end thereof coupled with a node between the current DAC and the wiring interface;
a second resistor, having one end thereof coupled with an output of the replica;
a third resistor, having one end thereof coupled with another output of the replica; and
a fourth resistor, having one end thereof coupled with another node between the current DAC and the wiring interface;
wherein, resistance values of the first, second, third and fourth resistors are equal;
wherein, the first resistor and the second resistor have their respective another ends connected with each other to form a first output terminal, while the third resistor and the fourth resistor have their respective another ends connected with each other to form a second output terminal, and the first and the second output terminals are coupled with the receiving end.

13. The passive echo cancellation device of claim 1, further comprising a current DAC and a replica of the current DAC, wherein the current DAC is furnished in the transmitting end for outputting an analog signal to the wiring interface, and said passive echo cancellation circuit further comprises:
a first capacitor, having one end thereof coupled with a node between the current DAC and the wiring interface;
a second capacitor, having one end thereof coupled with an output of the replica;
a third capacitor, having one end thereof coupled with another output of the replica; and
a fourth capacitor, having one end thereof coupled with another node between the current DAC and the wiring interface;
wherein, resistance values of the first, second, third and fourth resistors are equal;
wherein, the first capacitor and the second capacitor have their respective another ends connected with each other to form a first output terminal, while the third capacitor and the fourth capacitor have their respective another ends thereof connected with each other to form a second output terminal, and the first and the second output terminals are coupled with the receiving end.

14. A passive echo cancellation device for being used in a full duplex communication system, in which the full duplex communication system comprises a transmitting end for transmitting a transmit signal to a wiring interface and a receiving end for receiving a receive signal from the wiring interface, and the passive echo cancellation device comprises:
an offset-signal-generating circuit, for generating an offset signal corresponding to the transmit signal; and
a passive echo cancellation circuit, comprising merely a plurality of passive elements, serially connected between the wiring interface and the receiving end, and connected to the offset-signal-generating circuit, for acquiring the offset signal and using the offset signal to offset an echo signal contained in the receive signal from the wiring interface so as to generate an output signal merely containing signal characteristics of the receive signal.

15. The passive echo cancellation device of claim 14, wherein the transmit signal at the transmitting end is generated by a line driver and the offset-signal-generating circuit is a voltage-drop circuit serially connected between the transmitting end and the wiring interface.

16. The passive echo cancellation device of claim 14, wherein the transmit signal at the transmitting end is generated by a current DAC and the offset-signal-generating circuit is a replica of the current DAC for generating the offset signal having a voltage value equal to a voltage value of the transmit signal.

17. The passive echo cancellation device of claim 14, wherein the passive echo cancellation circuit further comprises:
a first passive element, having one end thereof coupled with a node between the transmitting end and the wiring interface;
a second passive element, having one end thereof coupled with an output of the offset-signal-generating circuit;
a third passive element, having one end thereof coupled with another output of the offset-signal-generating circuit; and
a fourth passive element, having one end thereof coupled with another node between the transmitting end and the wiring interface;
wherein, the first passive element and the second passive element have their respective another ends connected with each other to form a first output terminal, while the third passive element and the fourth passive element have their respective another ends connected with each other to form a second output terminal and the first and the second output terminals are coupled with the receiving end.

18. The passive echo cancellation device of claim 17, wherein the first to fourth passive elements are either resistors or capacitors.

19. A method for receiving and transmitting signals, comprising:
   providing a receiving-and-transmitting route;
   receiving a receive signal and transmitting a transmit signal through the receiving-and-transmitting route so as to generate an echo signal as a superimposition of the receive signal and the transmit signal;
   providing an offset signal containing characteristics of the transmit signal; and
   using a passive echo cancellation circuit, which comprises merely passive elements, to eliminate the transmit signal contained in the echo signal according to the offset signal so as to generate an output signal containing merely signal characteristics of the receive signal.

20. The method of claim 19, wherein the transmit signal is generated by a line driver.

21. The method of claim 19, wherein the transmit signal is generated by a current DAC.

22. The method of claim 19, wherein the echo cancellation circuit comprises merely a plurality of resistors.

23. The method of claim 19, wherein the echo cancellation circuit comprises merely a plurality of capacitors.

* * * * *